United States Patent [19]

Wier

[11] 3,773,042
[45] Nov. 20, 1973

[54] APPARATUS FOR PREVENTION OF RECURRENCE OF PROLAPSED UTERUS
[76] Inventor: Bert Wier, Rt. 3, Pauls Valley, Okla. 73075
[22] Filed: Aug. 30, 1971
[21] Appl. No.: 176,198

[52] U.S. Cl. ............................................. 128/130
[51] Int. Cl. ............................................ A61f 5/46
[58] Field of Search.................. 128/130, 127, 345; 273/106 D, 106 R; 46/25

[56] References Cited
UNITED STATES PATENTS
2,035,629   3/1936   Wing.............................. 273/106 D
2,972,481   2/1961   Shapiro.......................... 273/106 D
FOREIGN PATENTS OR APPLICATIONS
718,215   11/1954   Great Britain.................. 273/106 D Primary Examiner—Richard A. Gaudet
Assistant Examiner—Lee S. Cohen
Attorney—William B. Kerkam, Jr.

[57] ABSTRACT

The recurrence of propalapsis of the uterus in an animal after replacing a prolapsed uterus is prevented by a cross-shaped member placed in the pelvic inlet. The arms of the cross-shaped member are resiliently and medially attached so that the cross-shaped member may have the arms aligned for insertion of the device, and, upon release after insertion, the device assumes its cross-shaped configuration and the ends thereof lodge against the walls of the pelvic inlet to retain the same in position and prevent any further prolapse of the uterus.

1 Claim, 5 Drawing Figures

Patented Nov. 20, 1973
3,773,042
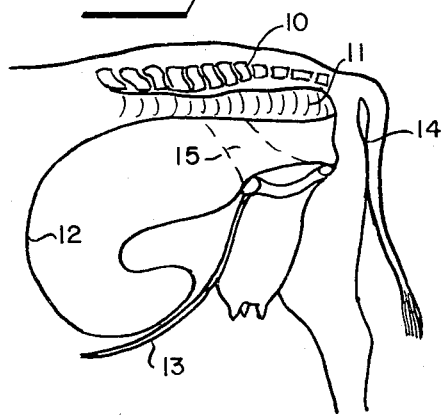
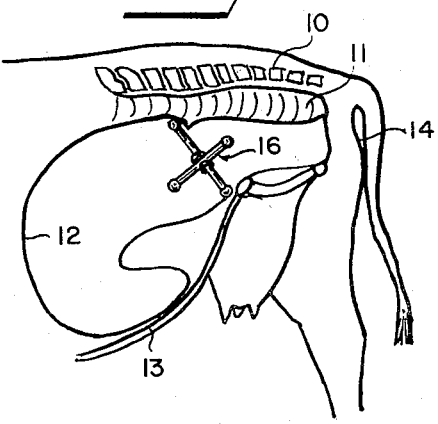
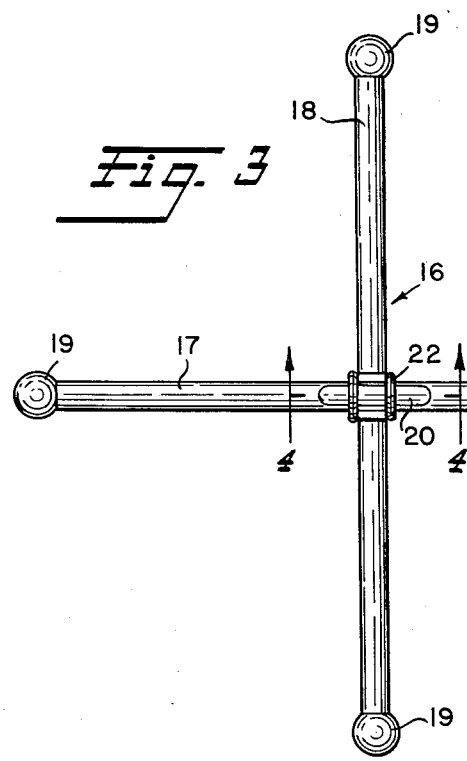
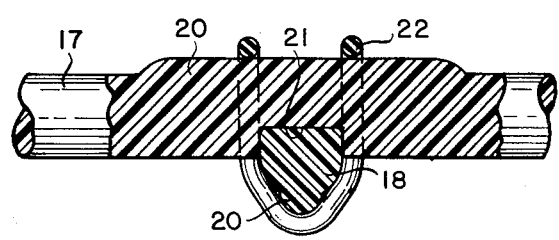
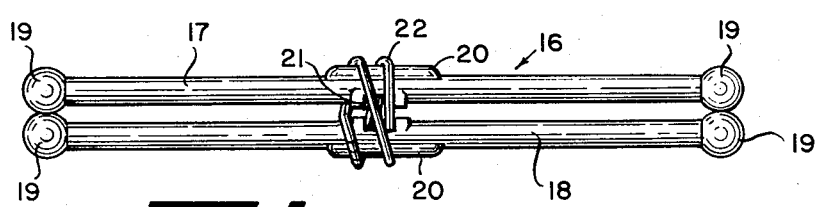
INVENTOR
BERT WIER
BY Cameron Kerkam & Sutton
ATTORNEYS

APPARATUS FOR PREVENTION OF RECURRENCE OF PROLAPSED UTERUS

BACKGROUND OF THE INVENTION

Heretofore various devices have been proposed for assisting in the return of a prolapsed uterus in a cow. A typical device is shown in U. S. Pat. No. 3,516,406 dated June 23, 1970, and entitled "Apparatus and Method for Replacing a Prolapsed Uterus." However, after replacement of a prolapsed uterus it usually occurs that the uterus prolapses again and, so far as is now known, only surgical procedures have previously been employed for preventing such recurrence. Such surgical procedures are difficult and painful to the animal and frequently result in the loss of the life of the animal.

The present invention, for the first time, provides a method of employing a device which is easily inserted into the pelvic inlet of the animal after a prolapsed uterus has been replaced to prevent further prolapsing thereof.

SUMMARY OF THE INVENTION

The present invention is for a method of employing a device for preventing recurrence of a prolapsed uterus after the uterus has been replaced in an animal comprising arms of equal or different lengths medially joined by resilient means whereby the arms may be aligned for insertion into the pelvic inlet of the animal and upon release, the resilient means return the arms to crossed position with the ends of the arms lodging in the walls of the pelvic inlet. The cross-shaped device so positioned prevents recurrence of prolapsing of the uterus and is left in the animal until any danger of prolapsing of the uterus has ceased whereupon the arms of the device are again aligned and the device withdrawn from the animal.

BRIEF DESCRIPTION OF THE DRAWINGS

In the accompanying drawings, in which like reference characters indicate like parts, FIG. 1 is a diagrammatic and sectional view of a portion of a cow showing the position of a prolapsed uterus after the same has been replaced in the animal;

FIG. 2 is a view similar to that of FIG. 1 showing a preferred embodiment of the present invention in place in the pelvic inlet of the animal to prevent a recurrence of prolapsing of the uterus;

FIG. 3 is an elevational view of the embodiment of the present invention shown in FIG. 2;

FIG. 4 is an enlarged detail of a portion of the embodiment of FIG. 3 on line 4—4 thereof; and FIG. 5 is a view of the embodiment of FIGS. 2 and 3 with the arms thereof in aligned position for insertion into or for removal from the pelvic inlet of the animal.

DESCRIPTION OF THE PREFERRED EMBODIMENT

Referring now to the several figures, and particularly to FIGS. 1 and 2, the rear portion of a cow is there shown with the backbone indicated at 10 and the rectum shown at 11 with a returned formerly prolapsed uterus 12 shown within the abdominal wall 13. The vulva is generally indicated at 14. The pelvic inlet is in the general region 15.

As seen in FIG. 2, the device of the present invention for preventing recurrence of a prolapsed uterus is shown generally at 16 in place in the pelvic inlet.

Referring now to FIGS. 3 and 4, device 16 includes arms 17 and 18 of equal length with each arm terminating in ball-shaped ends 19 to secure the device in the walls of the pelvic inlet without injury to the tissues. The length of arms 17 and 18 may vary in accordance with the size of the animal. For a medium sized cow such arms should range from 7¾ to 8 inches in length. Arm 17 is identical in construction to arm 18. Arms 17 and 18 may be of different lengths depending upon the type of animal.

Arms 17 and 18 are preferably cast from a suitable strong rigid plastic material but can be made of metal or even of wood. When made of plastic material, each arm 17 and 18 is provided centrally along its length with a reinforcing ridge 20 and is provided with a rectangular slot 21 for mating with the corresponding slot in the other arm when the device is in its cross position. A resilient device 22 is looped around the joint or junction of arms 17 and 18 to hold the same in interlocked position.

As seen in FIG. 5, arms 17 and 18 have been aligned disengaging them at their mid-section against the action of resilient member 22 and in this aligned condition the device is readily inserted through the vulva 14 into position adjacent the pelvic inlet 15 where the arms 17 and 18 are released. Resilient member 22 then rotates the arms to crossed position. The arms interengage at the joint formed by recesses 21 and the ball ends 19 thereof engage in the walls of the pelvic inlet and the device is there retained. The reverse procedure is employed for removing device 16.

Resilient member 22 is preferably an endless rubber band or similar resilient construction lapped around one of the arms with the other arm then passed through the ends thereof.

The above-described preferred embodiment of the present invention should not be construed as defining or limiting the scope of the same and reference should be had to the appended claims to determine the scope of this invention.

What I claim is:

1. A method for preventing reccurence of prolapsed uterus in an animal comprising the steps of inserting in the pelvic inlet a device having two arms of equal length of about 8 inches resiliently held in crossed position, engaging the ends of the arms with the walls of the pelvic inlet and retaining the device in position in the pelvic inlet until any danger of prolapsing of the uterus has ceased.

* * * * *